United States Patent [19]

Pietsch et al.

[11] Patent Number: 4,616,874
[45] Date of Patent: Oct. 14, 1986

[54] VEHICLE SEAT ASSEMBLY

[75] Inventors: Helge Pietsch, Detmold; Manfred Rink, Bielefeld; Christian Süss, Bad Salzuflen, all of Fed. Rep. of Germany

[73] Assignee: Gebr. Isringhausen, Lemgo, Fed. Rep. of Germany

[21] Appl. No.: 615,045

[22] Filed: May 29, 1984

[30] Foreign Application Priority Data

Jun. 1, 1983 [DE] Fed. Rep. of Germany ....... 3320009

[51] Int. Cl.⁴ .............................................. B60N 1/06
[52] U.S. Cl. .................................... 297/321; 248/394; 297/330; 297/338; 297/340; 297/343; 297/345
[58] Field of Search ............... 297/313, 316, 320, 321, 297/330, 337, 338, 340, 343, 345; 248/371, 394

[56] References Cited

U.S. PATENT DOCUMENTS

| 1,382,084 | 6/1921 | Himes | 297/320 |
| 2,608,239 | 8/1952 | Gorden | 297/330 X |
| 2,809,689 | 10/1957 | Garvey et al. | |
| 3,147,038 | 9/1964 | Barabas | 297/316 X |
| 3,319,921 | 5/1967 | Nichols | |
| 3,337,266 | 8/1967 | Burns | 297/330 X |
| 3,362,746 | 1/1968 | Huyge | 297/313 |

Primary Examiner—William E. Lyddane
Assistant Examiner—Peter R. Brown
Attorney, Agent, or Firm—Salter & Michaelson

[57] ABSTRACT

A vehicle seat assembly is for a vehicle seat having a back rest and a seat surface.

The back rest is adjustable in inclination and the seat surface is adjustable in height and inclination.

To reduce the height of the assembly and to enable the height and inclination of the seat surface to be adjusted independently of the back rest inclination, the seat frame is supported at its front end by levers. At the rear end of the seat frame is a support frame and a back rest frame, the back rest frame being movable relative to the support frame to raise and lower the rear end of the seat frame. The support frame and back rest frame are movable together about a horizontal axis to adjust the inclination of the back rest and the seat frame is suspended at its rear end on the back rest frame.

3 Claims, 4 Drawing Figures

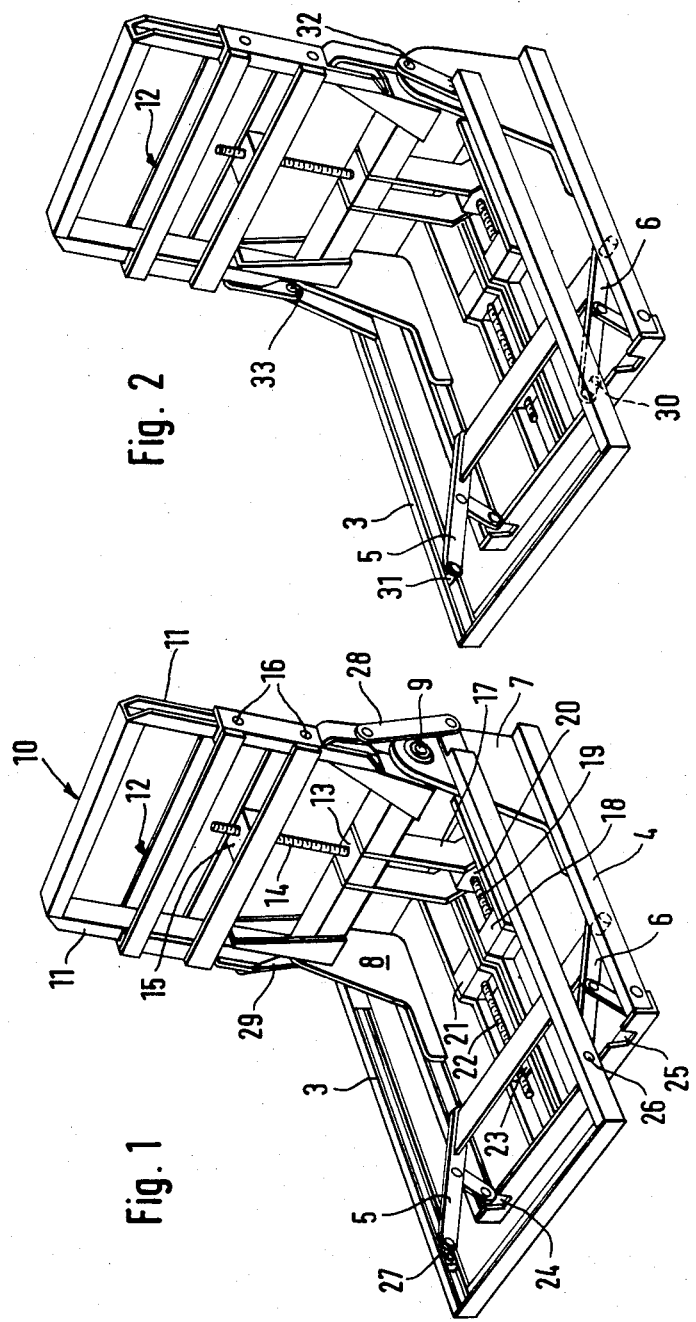

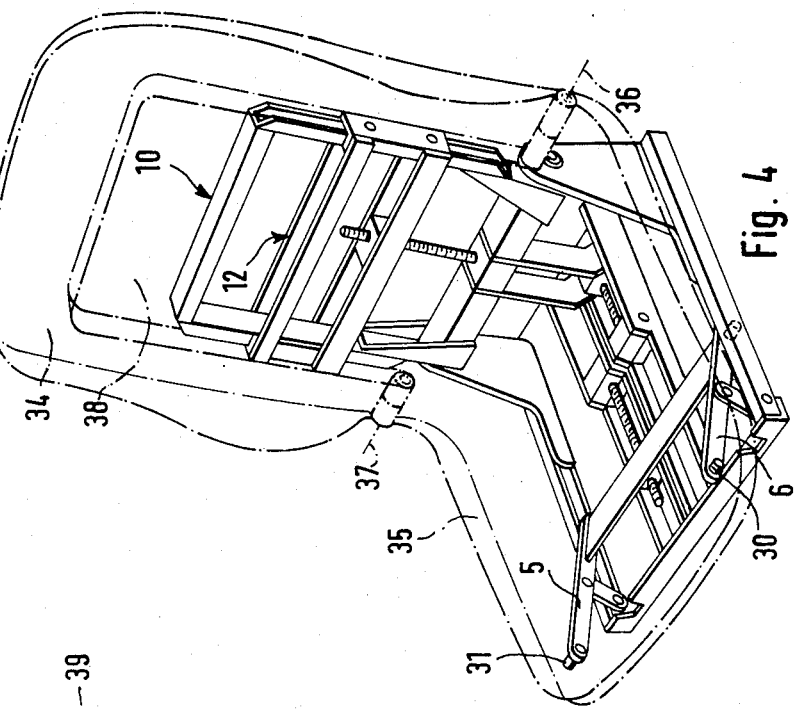
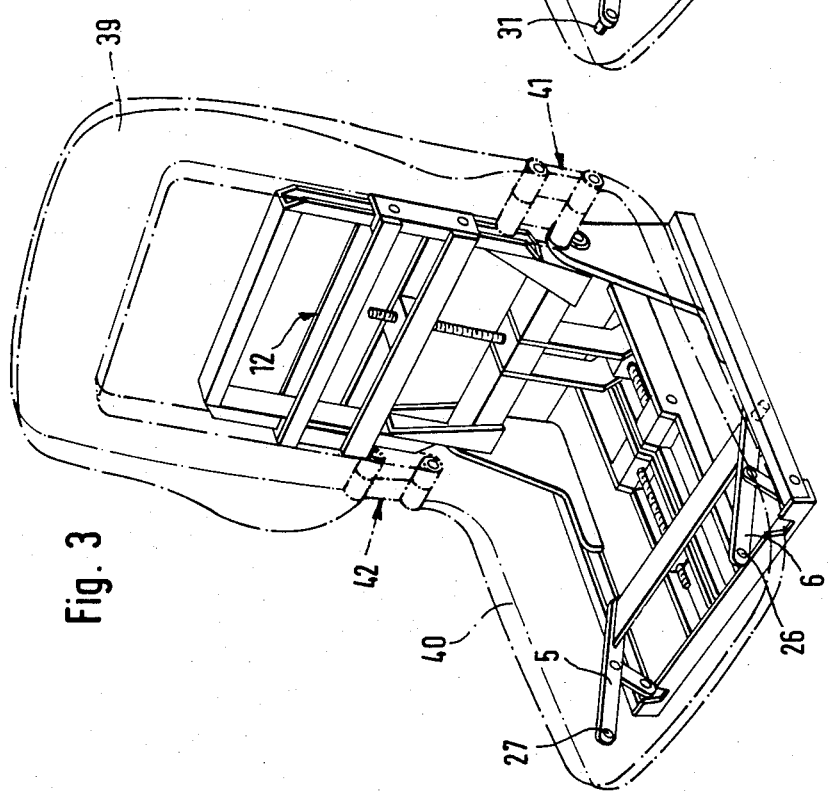

VEHICLE SEAT ASSEMBLY

This invention relates to a vehicle seat assembly for a vehicle seat having a back rest and a seat surface and, in particular, to a vehicle seat assembly in which the inclination of the back rest is adjustable and in which the seat surface is adjustable in inclination and in height.

It has been proposed to provide vehicle seats in which the seat includes a seat frame the front and rear ends of which is supported on adjustable support levers. In such an arrangement vertical adjustment of the seat surface is produced by equal displacements of the setting angles of the support levers. If an adjustment of the inclination of the seat surface is required the setting angles of the support levers at the front end or back end of the seat are adjusted. In such seats adjustment of the setting of the support levers to alter the seat surface inclination also causes the inclination of the back rest to change and this is disadvantageous to drivers.

Another disadvantage with known seats is that even when the seat surface is retracted to its lowest position the support levers occupy a significant height because the levers cannot be retracted to a horizontal position but always require to be inclined to the horizontal in order that upward movement of the seat may be effected.

An object of the invention is to provide a vehicle seat assembly whereby a vehicle seat may have a low height in its fully lowered condition and in which the inclination of the back rest is adjusted independently of the adjustment of the seat surface.

According to the invention a vehicle seat assembly for a vehicle seat having a back rest and a seat surface, comprises an underframe, a seat frame for the seat surface located above the underframe and supported at its front end on the underframe by pivotal support levers, a support frame pivotal about a horizontal axis and extending in the direction of the back rest, and a back rest frame mounted on the support frame and extending at a right angle to the axis of pivoting of the support frame, the back rest frame being movable relative to and in the direction of the support frame, and back rest being attachable rigidly to the back rest frame, and the seat frame being suspended at its rear end on the back rest frame.

By the use of pivotal levers at the front end of the seat frame and provision of the back rest frame movement relative to the support frame in the nature of an elevating or telescopic movement, that support levers can be moved to a horizontal position and the assembly may occupy a relatively low height at its lowest setting. However the seat frame can still be raised from its lowest setting because the suspension of the rear end of the seat frame on the back rest frame enables the seat frame to be lifted by lifting of the back rest frame even when the support levers are in a horizontal position.

Moreover due to the arrangement of the assembly the height or inclination of the seat surface can be adjusted without any unintended change in the inclination of the back rest simultaneously with the seat surface adjustment.

Preferably the support frame, the back rest frame and actuating means for moving the back rest frame relative to the support frame are housed in the back rest. By this arrangement the components causing movement of the back rest frame relative to the support frame can be built into the back rest and as few components as possible need to be located in the space below the seat surface and retraction of the seat surface is unimpeded.

The assembly construction makes it particularly suitable to enable shells of synthetic material to be used. According to a further feature of the invention the back rest frame includes a shell of synthetic material rigidly fixed to the back rest frame, and the seat frame comprises a shell of synthetic material suspended at its rear end on the back rest shell so as to be pivotable about a horizontal axis. In this arrangement the usual metal seat frame may be replaced by the shell of synthetic material.

In one arrangement the seat frame is attached to the back rest frame by pivot pins so as to be pivotable about a single pivot axis. Alternatively the seat frame is suspended from the back rest frame by pivoting links each pivotally attached at one end to the seat frame and at the other end to the back rest frame.

Embodiments of the invention will now be described by way of example only and with reference to the drawings, in which:

FIG. 1 is a schematic perspective view of one embodiment of the invention,

FIG. 2 is a schematic perspective view of another embodiment of the invention,

FIG. 3 is a schematic perspective view of a third embodiment of the invention, and FIG. 4 is a schematic perspective view of a fourth embodiment of the invention.

Referring to the drawings a vehicle seat assembly is shown in each of FIGS. 1–4 which is similar in construction to the others. The same reference numbers are applied to the same parts in the different embodiments and a description of the FIG. 1 embodiment also applies for the most part to those of FIGS. 2–4.

In FIG. 1 a vehicle seat assembly includes a seat frame 3 on which a seat cushion (not shown) for defining a seat surface is to be located. The seat frame 3 is supported above an underframe 4 at its front end by support levers 5 and 6.

The rear end of the underframe 4 carries upwardly extending brackets 7 and 8 rigidly mounted at the sides of the underframe 4. A support frame 10 is pivotally mounted on the brackets 7 and 8 so that the frame 10 pivots about a horizontal axis 9 to adjust the inclination of the frame 10. The support frame 10 extends in the direction of the seat back rest (not shown) which is in the upwards direction as shown.

The support frame 10 includes side frame members 11 of U-shape in cross-section, the channels presented by the members 11 being directed outwardly.

A back rest frame 12 encloses the frame 10 and is guided for movement relative to the frame 10 by rollers or slides (not shown).

In the illustrated embodiment an actuating device for effecting movement of the back rest frame 12 relative to the support frame 10 includes an electric motor 13 secured to the frame 10, a spindle 14 driven by the motor 13, and a running nut 15 through which the spindle passes and which is fixed to the back rest frame 12.

The back rest frame 12 includes on its lateral sides bores 16 for the rigid attachment of the back rest to the frame 12. The support frame 10, the back rest 12 together with the actuating device 13, 14 and 15 are protected inside the back rest behind the cushion incorporated into the back rest.

The frames 10 and 12, and hence the back rest, are pivoted about the axis 9 to adjust the inclination of the back rest and such pivoting action is effected through a lever 17 carried on the support frame 10 and moved by an electric motor 18, a spindle 19 driven by the motor 18 and a running nut 20 carried on the lever 17.

A similar actuating arrangement including an electric motor 21, a spindle 22 and a running nut 23 effects movement of the support levers 5 and 6 and this arrangement is mounted on the underframe 4 parallel to the drive arrangement 18, 19, 20 for the lever 17.

As can be seen in the drawings the drive arrangement for the levers 5 and 6 and for the lever 17 are fitted into the underframe so that they occupy little space. Other drive arrangements to those shown can be employed.

When it is desired to alter the seat surface height or inclination the drive motors 13 and 21 are operated and such operation alters the inclination of the levers 5 and 6 and/or the position of the frame 12 relative to the frame 10.

The height of the seat frame 3 can be adjusted until the levers 5 and 6 lie flat or aligned with the underframe 4. For this purpose the underframe 4 is formed with recesses 24 and 25 to receive the levers 5 and 6. The seat frame 3 is formed of larger size than the underframe 4 so that in its fully lowered or retracted state the seat frame 3 overlaps at least part of the underframe.

To raise the seat frame 3 from a fully lowered position the motor 13 is first operated to lift up the rear end of the frame 3 which at the same time causes the levers 5 and 6 at the front end of the seat frame 3 to be lifted and inclined upwards such that operation of the motor 21 will now pivot the levers 5 and 6 and lift the front end of the seat frame 3.

In the FIG. 1 arrangement the upper ends of the levers 5 and 6 are each connected to the seat frame 3 by fixed pivots 26 and 27. The rear end of the seat frame 3 is suspended on the back rest frame 12 by levers 28 and 29 one end of each of which levers is pivoted to the seat frame 3 and the other end is pivoted to the frame 12.

In the seat assembly shown in FIG. 2 the upper ends of the levers 5 and 6 are connected to the seat frame 3 through pivots 30 and 31 slidable relative to the frame 3. The rear end of the seat frame 3 is suspended on the back rest frame 12 by fixed pivots 32 and 33. In other respects the FIG. 2 embodiment corresponds to that of FIG. 1.

Referring now to FIG. 4 the seat assembly shown corresponds to the FIG. 2 embodiment except that the back rest frame 12 is fixed to a back rest shell 34 of synthetic material and the seat frame is formed as a shell 35 of synthetic material.

The seat shell 35 replaces the metal seat frame 3 of FIG. 2 and is suspended relative to the back rest shell 34 and the back rest frame 12 by means of pivots 36 and 37. The back rest frame 12, the support frame 10, and the actuating means 13, 14 and 15 are located in a space 38 defined by the back rest shell 34. The upper ends of the levers 5 and 6 are again formed as sliding pivots 30 and 31 movable along suitable guides in the seat shell 35. In other respects the FIG. 4 construction corresponds to that of FIG. 1.

In FIG. 3 is shown a seat assembly similar to that of FIG. 1 but having a back rest shell 39 of synthetic material and a seat shell 40 also of synthetic material, the shell 40 replacing the metal seat frame 3. The seat shell 40 is suspended relative to the back rest shell 39 by levers 41, 42 corresponding to the levers 28 and 29 of FIG. 1. The upper ends of the levers 5 and 6 are formed as fixed pivots 26 and 27.

What we claim as our invention and desire to secure by Letters Patent of the United States is:

1. A seat assembly for a vehicle seat comprising:
   (a) an underframe;
   (b) a seat frame above said underframe;
   (c) a pair of spaced support levers supporting the forward portion of said seat frame on said underframe so that the forward portion of said seat frame is adjustably positionable in spaced relation above the forward portion of said underframe;
   (d) a support frame pivotally mounted on the rear portion of said underframe so that it is pivotable toward and away from said seat frame about an axis located in the rear portion of said underframe;
   (e) a backrest frame slidably mounted on said support frame so that it is movable thereon toward and away from said axis but so that it is adjustably securable with respect to said suport frame; and
   (f) means for maintaining said backrest frame in adjusted position relative to said support frame;
   (g) means pivotally suspending the rear portion of said seat frame from said backrest frame;
   (h) whereby vertical movement of said backrest frame effects vertical movement of the rear portion of said seat frame.

2. The seat assembly of claim 1 further comprising means mounted on said backrest frame for moving said backrest frame relative to said support frame.

3. In the seat assembly of claim 1 said pivotal suspending means comprising a pair of spaced pivot links, each of said pivot links being pivotally attached to both said backrest frame and said seat frame.

* * * * *